United States Patent
Yoon et al.

(10) Patent No.: US 12,540,738 B2
(45) Date of Patent: Feb. 3, 2026

(54) AIR CONDITIONER INCLUDING LIGHTING MODULE

(71) Applicant: SAMSUNG ELECTRONICS CO., LTD., Suwon-si (KR)

(72) Inventors: Joonho Yoon, Suwon-si (KR); Gahyun Kim, Suwon-si (KR); Mingi Cho, Suwon-si (KR); Donghyun Kim, Suwon-si (KR); Sungwoo Kim, Suwon-si (KR); Mingu Jeon, Suwon-si (KR); Jinwoo Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 622 days.

(21) Appl. No.: 17/975,860

(22) Filed: Oct. 28, 2022

(65) Prior Publication Data

US 2023/0175707 A1 Jun. 8, 2023

Related U.S. Application Data

(63) Continuation of application No. PCT/KR2022/015203, filed on Oct. 7, 2022.

(30) Foreign Application Priority Data

Dec. 8, 2021 (KR) .................. 10-2021-0175200

(51) Int. Cl.
*F24F 1/0014* (2019.01)
*F24F 1/0022* (2019.01)
(Continued)

(52) U.S. Cl.
CPC .......... *F24F 1/0014* (2013.01); *F24F 1/0022* (2013.01); *F24F 1/0047* (2019.02); *F24F 13/14* (2013.01); *F24F 2221/02* (2013.01)

(58) Field of Classification Search
CPC ...... F24F 1/0014; F24F 1/0022; F24F 1/0047; F24F 1/0011; F24F 13/10; F24F 13/14; F24F 13/20
See application file for complete search history.

(56) References Cited

U.S. PATENT DOCUMENTS 8,387,404 B2 3/2013 Choi et al.
10,969,122 B2 4/2021 Kim et al.
(Continued)

FOREIGN PATENT DOCUMENTS

CN 105003961 A * 10/2015
CN 209054664 U 7/2019
(Continued)

OTHER PUBLICATIONS

European Search Report dated Dec. 5, 2024, in European Application No. EP 22 90 4424.
(Continued)

*Primary Examiner* — Allen R. B. Schult
(74) *Attorney, Agent, or Firm* — STAAS & HALSEY LLP (57) ABSTRACT

An air conditioner including an air conditioning module, a lighting module and a discharge guide between the air conditioning module and the lighting module. The air conditioning module includes a housing, air inlet, air outlet, heat exchanger, and fan. The lighting module includes a moveable lighting panel. The discharge guide moves with the lighting module. The lighting panel is moveable between a first position in which the lighting panel allows air to enter the air inlet and to be discharged from the air outlet and the discharge guide blocks the discharged air from entering the air inlet, and a second position in which the lighting panel
(Continued)

restricts air from entering the air inlet and from being discharged from the air outlet as compared to the first position.

16 Claims, 12 Drawing Sheets

(51) Int. Cl.
  *F24F 1/0047*  (2019.01)
  *F24F 13/14*  (2006.01)

(56) References Cited

U.S. PATENT DOCUMENTS

2017/0146248 A1    5/2017  Yamaguchi
2019/0360649 A1*  11/2019  Puffer ................. F21V 23/0435

FOREIGN PATENT DOCUMENTS

| | | |
|---|---|---|
| EP | 1 686 325 B1 | 6/2008 |
| JP | 6147431 | 5/2017 |
| JP | 2019-11928 | 1/2019 |
| KR | 20-0293012 | 10/2002 |
| KR | 10-2004-0016119 | 2/2004 |
| KR | 10-2013-0142766 | 12/2013 |
| KR | 10-2015-0032995 | 4/2015 |
| KR | 10-1558575 | 10/2015 |
| KR | 10-1352527 | 1/2017 |
| KR | 10-2032192 | 10/2019 |
| WO | WO 2017/101784 A1 | 6/2017 |
| WO | WO 2020/105929 A1 | 5/2020 |

OTHER PUBLICATIONS

Written Opinion, PCT/ISA/237, and International Search Report, PCT/ISA/210, dated Jan. 25, 2023 issued in PCT Application No. PCT/KR2022/015203.

* cited by examiner

AIR CONDITIONER INCLUDING LIGHTING MODULE

CROSS-REFERENCE TO RELATED APPLICATIONS

This application is a continuation of International Application No. PCT/KR2022/015203 designating the United States, filed on Oct. 7, 2022, in the Korean Intellectual Property Receiving Office and claiming priority to Korean Patent Application No. 10-2021-0175200 filed on Dec. 8, 2021, in the Korean Intellectual Property Office, the disclosures of which are incorporated by reference herein in their entireties.

BACKGROUND

1. Field

Embodiments of the disclosure relate to an air conditioner including a lighting module.

2. Description of Related Art

An air conditioner is a device that sucks indoor air, performs a heat-exchanging process on the sucked air, and then discharges the heat-exchanged air inside a closed space. Air conditioners are roughly divided into a stand type that is placed on the floor and a ceiling type that is installed on the ceiling.

The air conditioner of the ceiling type generally sucks indoor air through an air inlet arranged at a center thereof, and discharges the heat-exchanged air inside a room through a plurality of air outlets arranged around the air inlet.

Such an air conditioner of the ceiling type may have a lighting function in addition to an air conditioning function. To perform the lighting function, the air conditioner of the ceiling type may include a lighting panel of a certain size in addition to an air conditioning module that performs the air conditioning function.

However, such an air conditioner has a limitation in the arrangement of the lighting panel due to presence of the air inlet and the air outlet for air conditioning.

SUMMARY

According to an embodiment of the disclosure, an air conditioner may include an air conditioning module including: a housing including an air inlet and an air outlet, a heat exchanger in the housing, and a fan in the housing; a lighting module including a moveable lighting panel; and a discharge guide between the air conditioning module and the lighting module that moves with the lighting module. The lighting panel may be moveable between: a first position in which the lighting panel allows air to enter the air inlet and allows air to be discharged from the air outlet, and the discharge guide blocks the air that is discharged from the air outlet from entering the air inlet, and a second position in which the lighting panel restricts air from entering the air inlet and restricts air from being discharged from the air outlet as compared to when the lighting panel is in the first position.

The length of the discharge guide may be greater than a length of the air outlet.

The discharge guide may include: a guide region that guides the air that is discharged from the air outlet; and a blocking region on opposite sides of the guide region and that blocks the air that is discharged from the air outlet from entering the air inlet.

The discharge guide may be coupled to a top surface of the lighting panel.

At least part of the discharge guide may be inserted into the air outlet when the lighting panel is in the second position.

The discharge guide may include: a downwardly-inclined sloped surface.

The discharge guide may include: an inclination adjusting unit configured to adjust an inclination of the slope.

The lighting module may further include a lighting frame having a space configured to accommodate the lighting panel when the lighting panel is in the second position.

The lighting panel may protrude downwardly from the lighting frame when the lighting panel is in the first position.

The air conditioner may further include: a gap between an edge of the lighting panel and the lighting frame. The gap may increase as the lighting panel moves from the second position to the first position.

The lighting frame may include: a sloped surface that is inclined downwardly and that surrounds the edge of the lighting panel.

When the lighting panel is in the first position: air may pass through one part of the edge of the lighting panel and may enter the air inlet, and air may be discharged from the air outlet and may then pass through a different part of the edge of the lighting panel.

The air inlet may be in a center portion of the housing on a bottom surface of the housing, and the air outlet may be on opposite sides of the air inlet on the bottom surface of the housing.

The lighting panel may include: a pair of first edges facing each other and a pair of second edges connecting end portions of the pair of first edges. When the lighting panel is in the first position, air may pass through the pair of first edges and may be sucked through the air inlet, and may be discharged from the air outlet and may pass through the pair of second edges.

The air conditioner may further include: an elevating unit including: a support pillar supporting the lighting panel, and an elevating driving unit configured to elevate the support pillar.

When the lighting panel is in the second position, the lighting panel may block air from entering the air inlet and may block air from being discharged from the air outlet.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, exemplary embodiments of the disclosure will be described in detail with reference to matters described in the accompanying drawings. The same reference numeral or symbol presented in each drawing represents a part or component that performs substantially the same function.

The terms including "first", "second", etc., may be used to explain various components, but the components are not limited by the terms. These terms may be used to distinguish one element from another element. For example, a first component may be referred to as a second component without departing from the scope of the disclosure, and similarly, the second component may be referred to as the first component. The term "and/or" may include a combination of a plurality of related items or any one of the plurality of related items.

The term used herein is used to describe an embodiment of the disclosure, and is not intended to limit and/or restrict the disclosure. Singular forms include plural forms unless apparently indicated otherwise contextually. Moreover, it should be understood that the term "include", "have", or the like used herein is to indicate the presence of features, numbers, steps, operations, elements, parts, or a combination thereof described in the specifications, and does not preclude the presence or addition of one or more other features, numbers, steps, operations, elements, parts, or a combination thereof. The same reference numeral presented in each drawing represents a member that substantially performs the same function.

Herein, an air conditioner is provided which may improve the freedom of arrangement of the lighting panel by moving a lighting panel up and down and implement a good air conditioning function through a discharge guide that guides air discharge when the lighting panel is moved down.

Figure 1:
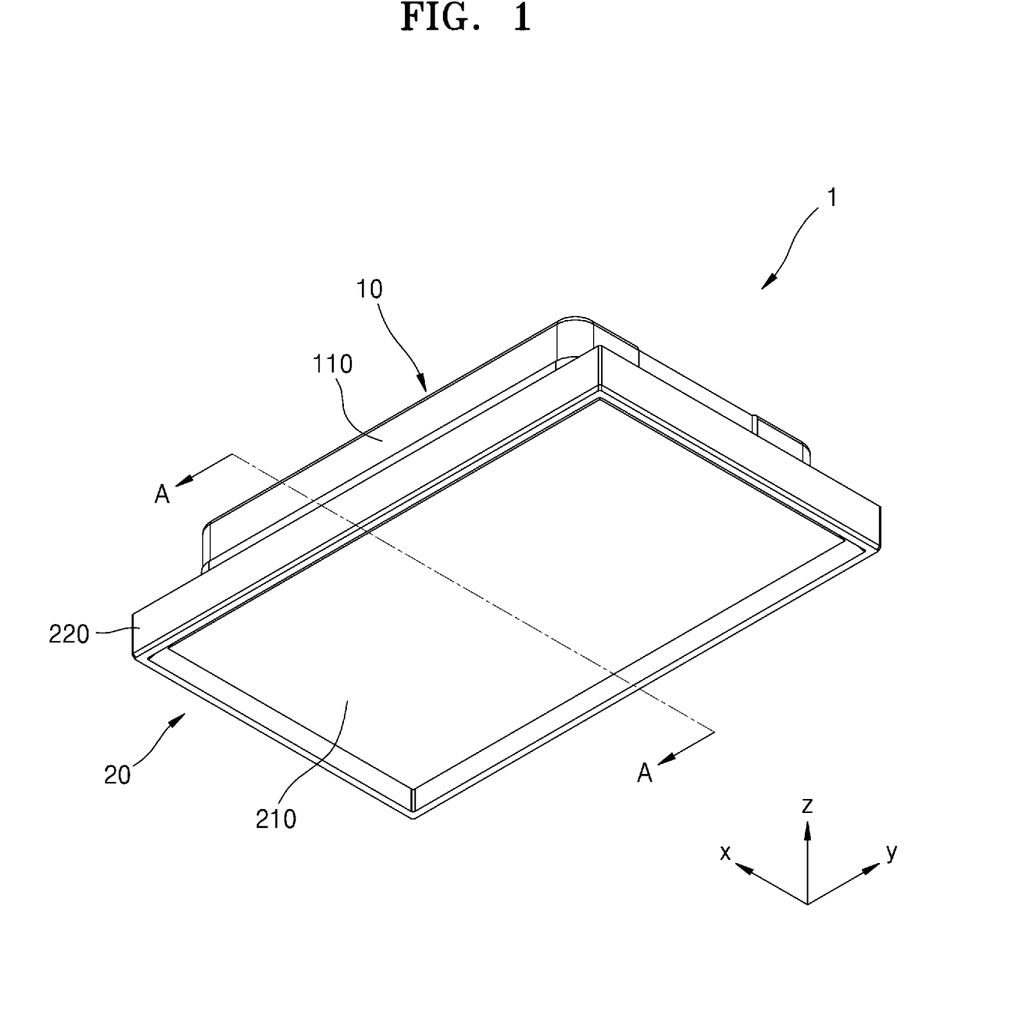
FIG. 1 is a perspective view showing an air conditioner according to an embodiment of the disclosure.
Figure 2:
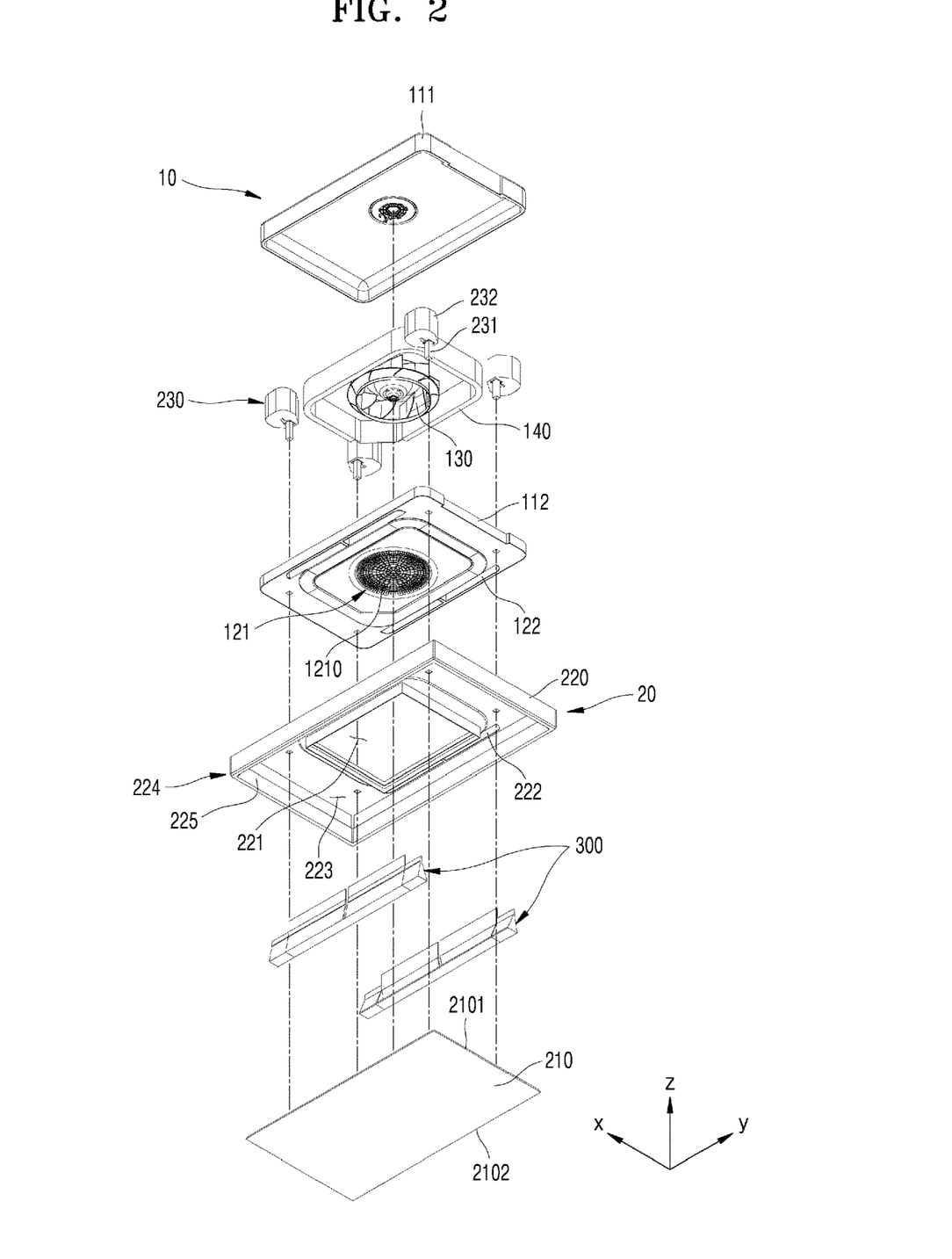
FIG. 2 is an exploded perspective view showing an air conditioner according to an embodiment of the disclosure.

FIG. 1 is a perspective view showing an air conditioner 1 according to an embodiment of the disclosure, and FIG. 2 is an exploded perspective view showing the air conditioner 1 according to an embodiment of the disclosure.

Referring to FIGS. 1 and 2, the air conditioner 1 according to an embodiment of the disclosure is a device having a lighting function together with an air conditioning function, and may include an air conditioning module 10 and a lighting module 20. The air conditioner 1 may be installed on a ceiling. For example, the air conditioner 1 may be installed by being partially embedded in the ceiling.

The air conditioning module 10 may include a housing 110, a heat exchanger 140, and a fan 130.

An air inlet 121 and an air outlet 122 may be provided in the housing 110. The air inlet 121 and the air outlet 122 may be arranged on a bottom surface of the housing 110. The housing 110 may include an upper housing 111 and a lower housing 112. The fan 130 may be rotatably installed in the upper housing 111, and the air inlet 121 and the air outlet 122 may be provided in the lower housing 112.

The air inlet 121 may be arranged in a center portion on the bottom surface of the housing 110, and the air outlet 122 may be arranged in opposite sides with the air outlet 121 therebetween on the bottom surface of the housing 110. A grill 1210 may be arranged in the air inlet 121. A planar shape of the air inlet 121 may be a circular shape, and the air outlet 122 may have a longer length than a diameter of the air inlet 121. The entire area of the air inlet 121 may be greater than the entire area of the air outlet 122. Herein, the planar shape may be defined as a cross-sectional shape in a plane direction (an xy direction) perpendicular to an up-down direction (a z direction).

The fan 130 may be arranged inside the housing 110. The fan 130 may be arranged on the air inlet 12. The fan 130 may generate flow to suck the indoor air inside the housing 110 through the air inlet 121 and discharge the indoor air outside the housing 110, i.e., inside the room, through the xt air outlet 122. The fan 130 may be, but is not limited to, a turbo fan.

The heat exchanger 140 may be arranged inside the housing 110 and may be arranged around the fan 130. The heat exchanger 140 may be arranged between the fan 130 and the air outlet 122 to change the temperature of the indoor air sucked through the air inlet 121. For example, the heat exchanger 140 may cool or heat the indoor air sucked through the air inlet 121. The air passing through the heat exchanger 140 may be discharged through the air outlet 122.

The lighting module 20 may be installed under the air conditioning module 10 and include the lighting panel 210. The lighting panel 210 may be arranged in the center portion of the air conditioner 1. For example, the lighting panel 210 may be arranged under the air conditioning module 10. The lighting panel 210 may be arranged to overlap the air inlet 121 and the air outlet 122 of the air conditioning module 10. The lighting panel 210 may include a light source (not shown) for generating light. The light source may be, but is not limited to, a light-emitting diode, a fluorescent lamp, an organic electro luminescence (EL).

The planar shape of the lighting panel 210 may be a quadrangular shape. For example, the planar shape of the lighting panel 210 may be a rectangular shape. The lighting panel 210 may include a pair of first edges 2101 facing each other and a pair of second edges 2102 connecting end portions of the pair of first edges 2101. The length of the second edge 2102 may be greater than the length of the first edge 2101. However, the planar shape of the lighting panel 210 may be, but is not limited to, various shapes such as a polygonal shape, a circular shape, an oval shape, etc.

The lighting module 20 may further include a lighting frame 220. The lighting frame 220 may be fixed to the housing 110 while surrounding an edge of the lighting panel 210. The lighting frame 220 may include a first opening 221 communicating with the air inlet 121 and a second opening 222 communicating with the air outlet 122.

The lighting frame 220 may provide an accommodating space 223 capable of accommodating the lighting module 20. An edge 224 of the lighting frame 220 may surround the edge of the lighting panel 210 and may have a planar shape corresponding to the planar shape of the lighting panel 210. For example, when the planar shape of the lighting panel 210 is rectangular, the planar shape of the lighting frame 220 may be rectangular. The planar size of the lighting frame 220 may be greater than the size of the lighting panel 210. The planar size of the lighting frame 220 may be greater than the planar size of the housing 110.

The edge 224 of the lighting frame 220 may have a downwardly-inclined slope 225. That is, the slope 225 is a downwardly-inclined surface such that an inner cross-sectional area of the lighting frame 220 increases in a downward direction, i.e., in a direction of −z. The slope 225 may be an inner surface of the edge 224. The slope 225 may perform a function of guiding movement of the air during air intake and discharge, together with a function of reflecting light of the lighting panel 210.

The lighting frame 220 may be mounted on the housing 110, as a component separate from the housing 110. However, the lighting frame 220 and the housing 110 are not limited thereto, and may be formed integrally.

When the air conditioner 1 is installed on the ceiling, the air conditioning module 10 may be embedded in the ceiling, and the lighting frame 220 and the lighting panel 210 of the lighting module 20 may be exposed inside a room. The air inlet 121 and the air outlet 122 of the air conditioning module 10 may be hidden by the lighting panel 210.

The lighting panel 210 may be placed under the air conditioning module 10 to be moved in the up-down direction z. The air conditioner 1 may further include an elevating unit 230 for elevating the lighting panel 210. The elevating unit 230 may include a plurality of support pillars 231 supporting the lighting panel 210 and an elevating driving unit 232 elevating the support pillars 231.

The elevating driving unit 232 may be provided inside the housing 110, and the support pillars 231 may be connected to the lighting panel 210 through the housing 110. As the height of the support pillar 231 is changed by the elevating driving unit 232, the lighting panel 210 supported by the support pillar 231 may be moved in the up-down direction z.

The lighting panel 210 may be moved in the up-down direction z to selectively guide air intake and discharge through the air inlet 121 and the air outlet 122 of the air conditioning module 10. For example, the lighting panel 210 may have a first position 211 (see FIG. 5) to which the lighting panel 210 is lowered to suck the indoor air through the air inlet 121 and discharge the air through the air outlet 122 and have a second position 212 (see FIG. 3) to which the lighting panel 210 is elevated to be close to the air inlet 121 and the air outlet 122. When the lighting panel 210 is at the second position 212, air intake through the air inlet 121 may be restricted and air discharge through the air outlet 122 may be restricted.

Figure 3:
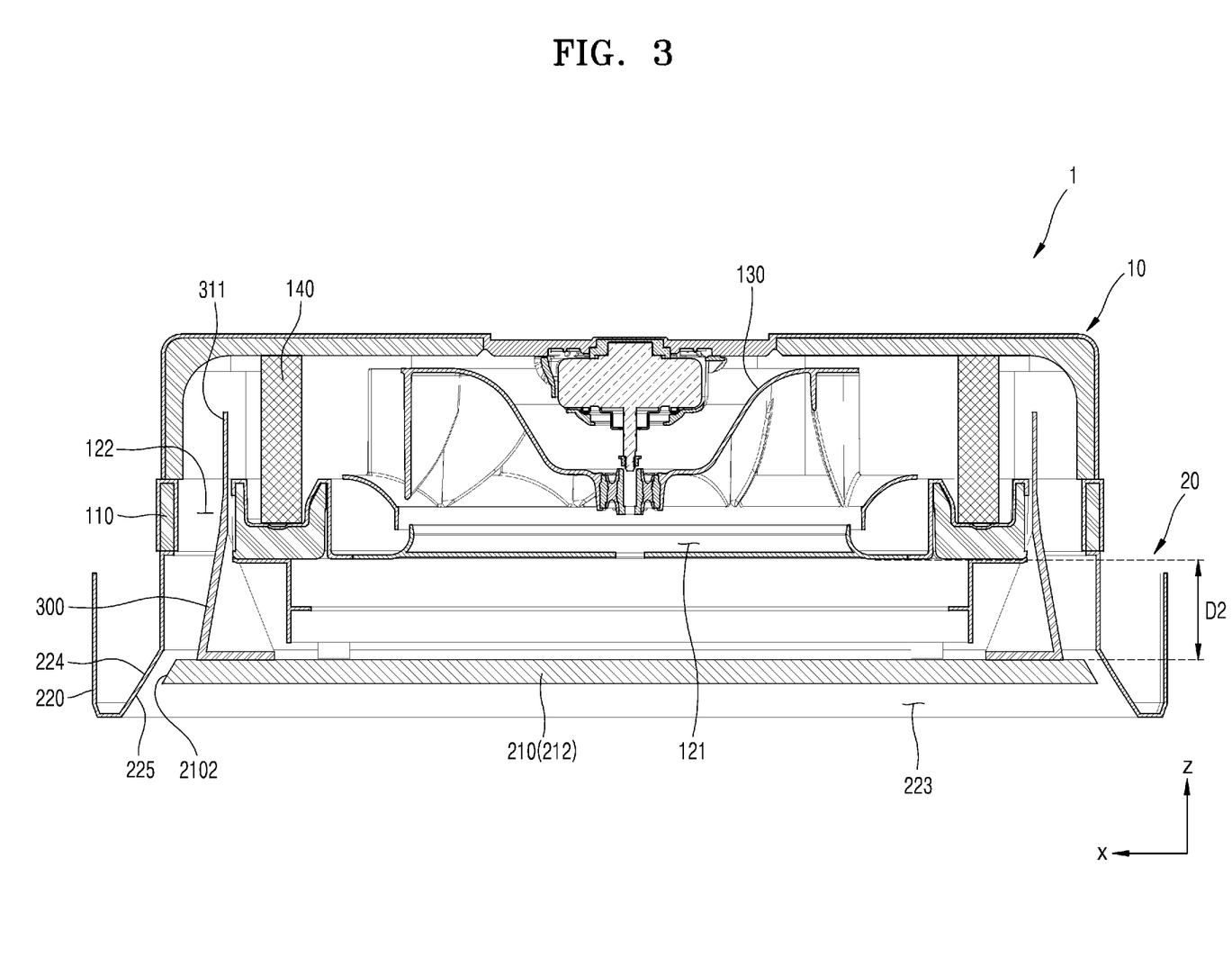
FIG. 3 is a cross-sectional view of the air conditioner of FIG. 1, taken along a line A-A.
Figure 4:
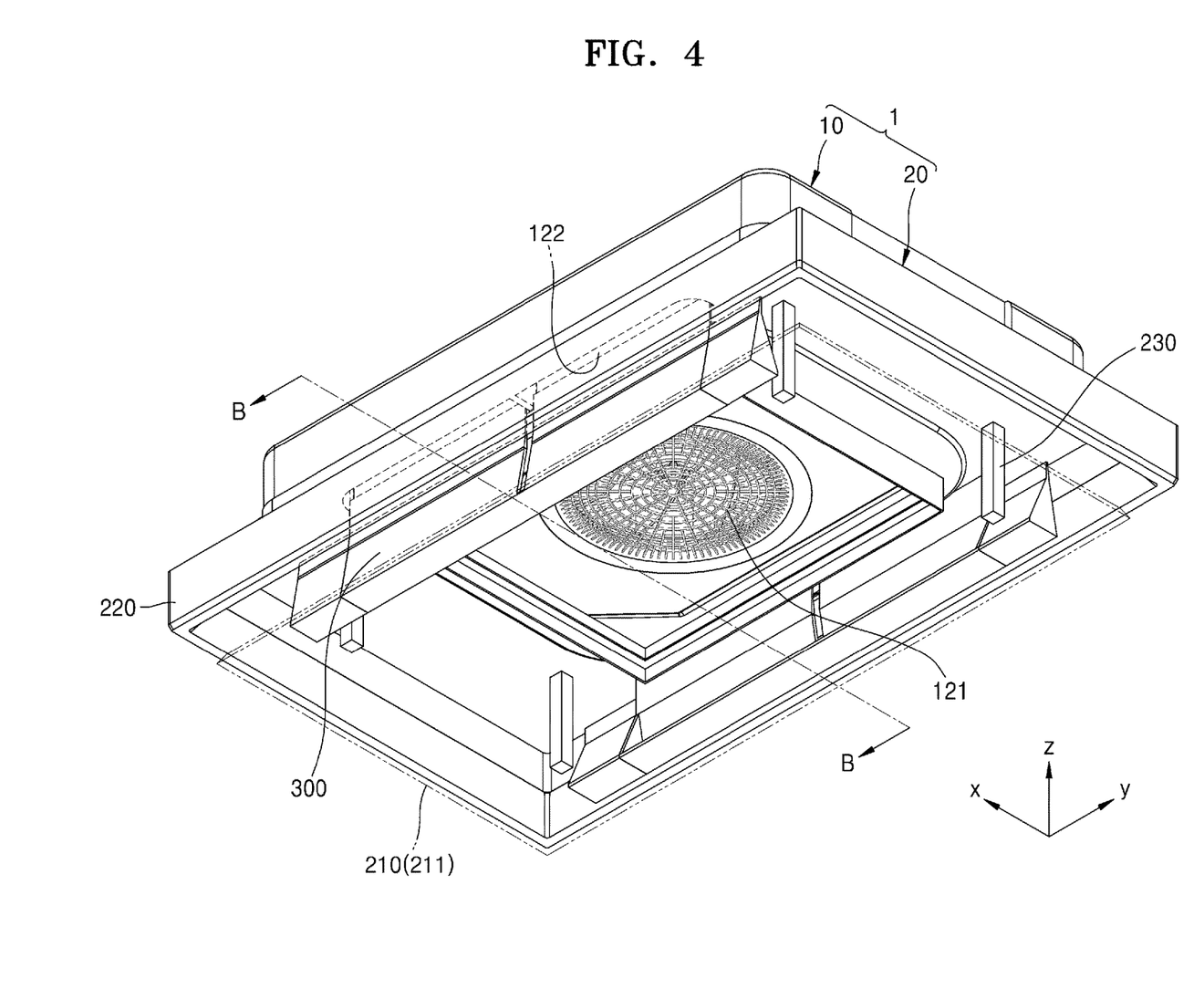
FIG. 4 is a perspective view of an air conditioner when a lighting panel is at a first position.
Figure 5:
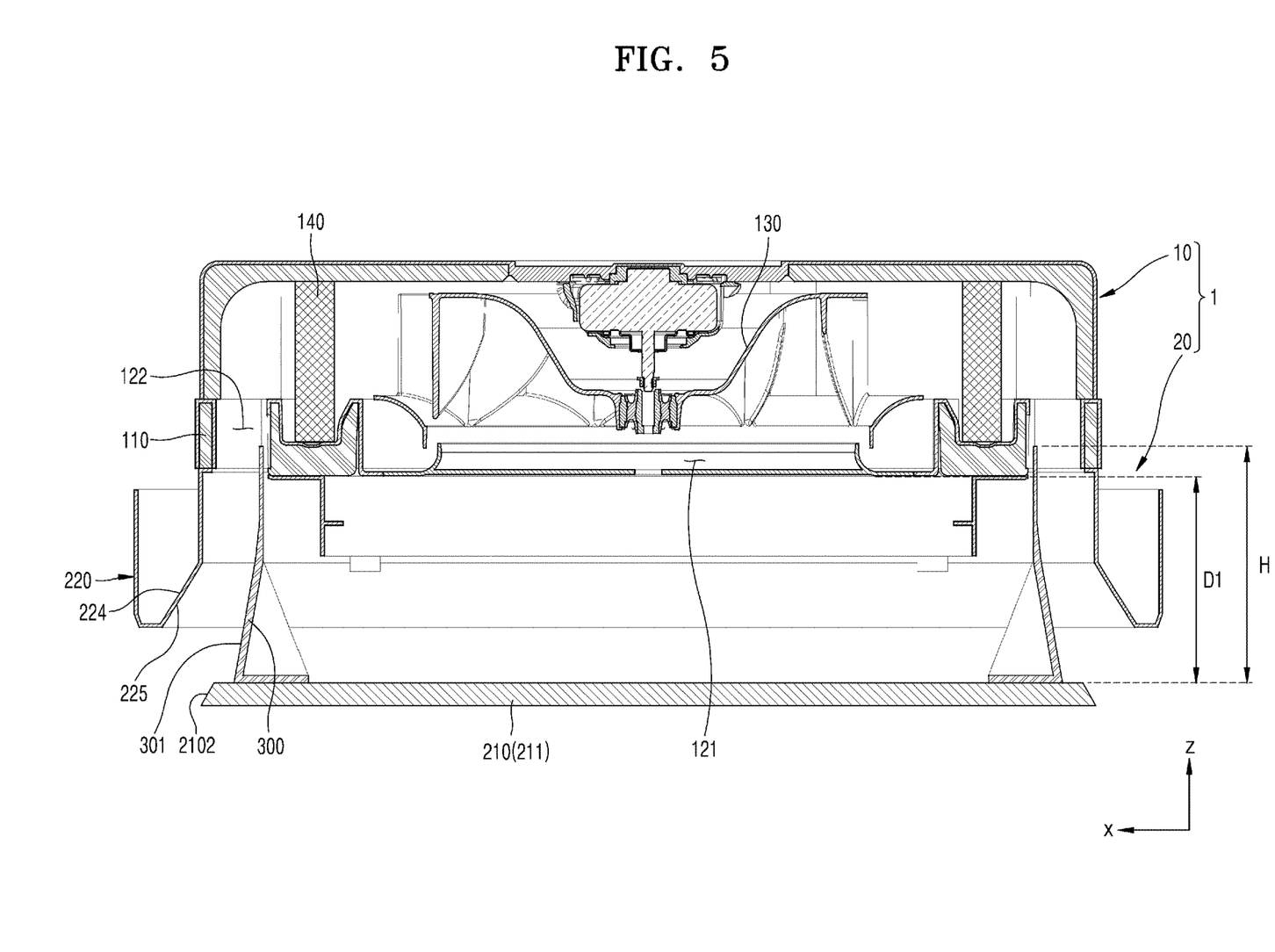
FIG. 5 is a cross-sectional view of the air conditioner of FIG. 4, taken along a line B-B.
Figure 6:
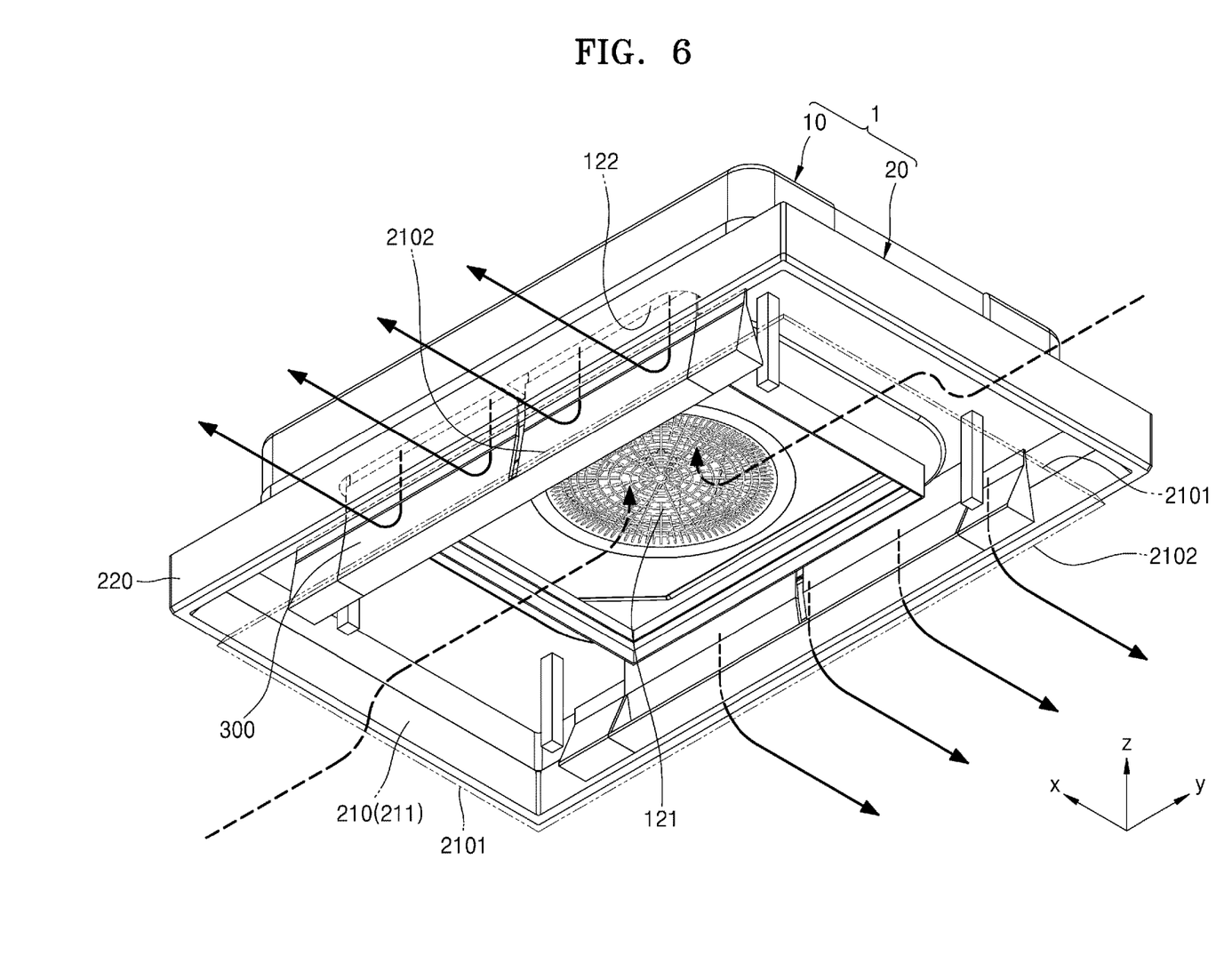
FIG. 6 is a view for describing an operation of the air conditioner of FIG. 4.

FIG. 3 is a cross-sectional view of the air conditioner 1 of FIG. 1, taken along a line A-A. FIG. 4 is a perspective view of the air conditioner 1 when the lighting panel 210 is at the first position 211, and FIG. 5 is a cross-sectional view of the air conditioner 1 of FIG. 4, taken along a line B-B. FIG. 6 is a view for describing an operation of the air conditioner 1 of FIG. 4.

Referring to FIG. 3, when the air conditioning module 10 is not used, the lighting panel 210 may be located at the second position 212 to cover (block) the air inlet 121 and the air outlet 122 of the air conditioning module 10. In this case, a gap between the edge 224 of the lighting frame 220 and the edge, i.e., the edges 2101 and 2102 of the lighting panel 210, is in a narrowed state. The lighting panel 210 may be accommodated in the accommodating space 223 of the lighting frame 220, and the lighting panel 210 may be in a state of not protruding from the lighting frame 220. In this case, the lighting panel 210 of the air conditioner 1 may perform as lighting. The slope 225 on the edge 224 of the lighting frame 220 may reflect light of the lighting panel 210 downwardly.

Referring to FIGS. 2, 4, and 5, when the air conditioning module 10 is used, the lighting panel 210 may be lowered by the elevating unit 230. For example, the lighting panel 210 may be lowered by about 40 mm to about 80 mm. When the lighting panel 210 is moved from the second position 212 to the first position 211 by being lowered, the edge, i.e., the edges 2101 and 2102, of the lighting panel 210 may be away from the lighting frame 220 and the gap between the edge, i.e., the edges 2101 and 2102, of the lighting panel 210 and the lighting frame 220 may increase. As the lighting panel 210 is lowered, the lighting panel 210 may be away from the housing 110 and the gap between the lighting panel 210 and the housing 110 may increase.

The lighting panel 210 lowered by the elevating unit 230 may be at the first position 211. The lighting panel 210 may be in a state of protruding from the lighting frame 220. The lighting panel 210 may be in a state of protruding from the lighting frame 220 by about 20 mm to about 40 mm. When the lighting panel 210 is at the first position 211, the lighting panel 210 may guide air intake and discharge through the air inlet 121 and the air outlet 122.

Referring to FIG. 6, when the lighting panel 210 is at the first position 211, the air may be sucked through the air inlet 121 of the air conditioning module 10 by passing through a partial region of the edge of the lighting panel 210 and the air discharged from the air outlet 122 of the air conditioning module 10 may be discharged by passing through the other region of the edge of the lighting panel 210. For example, when the lighting panel 210 is at the first position 211, the air conditioner 1 may suck the indoor air through the air inlet 121 of the air conditioning module 10 by passing through the pair of first edges 2101 of the lighting module 10 and discharge the air discharged from the air outlet 122 of the air conditioning module 10 by passing through the pair of second edges 2102 of the lighting panel 210. A path of the air moving through the edge of the lighting panel 210 is an example, and may vary depending on the arrangement of the air inlet 121 and the air outlet 122.

However, the air conditioning module 10 operates in a state where lighting panel 210 is arranged under the air inlet 121 and the air outlet 122, such that the air discharged from the air outlet 122 may be sucked through the air inlet 121 without being spread inside the room. In this regard, the air conditioner 1 according to an embodiment of the disclosure may further include a discharge guide 300 arranged between the housing 110 of the air conditioning module 10 and the lighting panel 210 of the lighting module 20.

Figure 7:
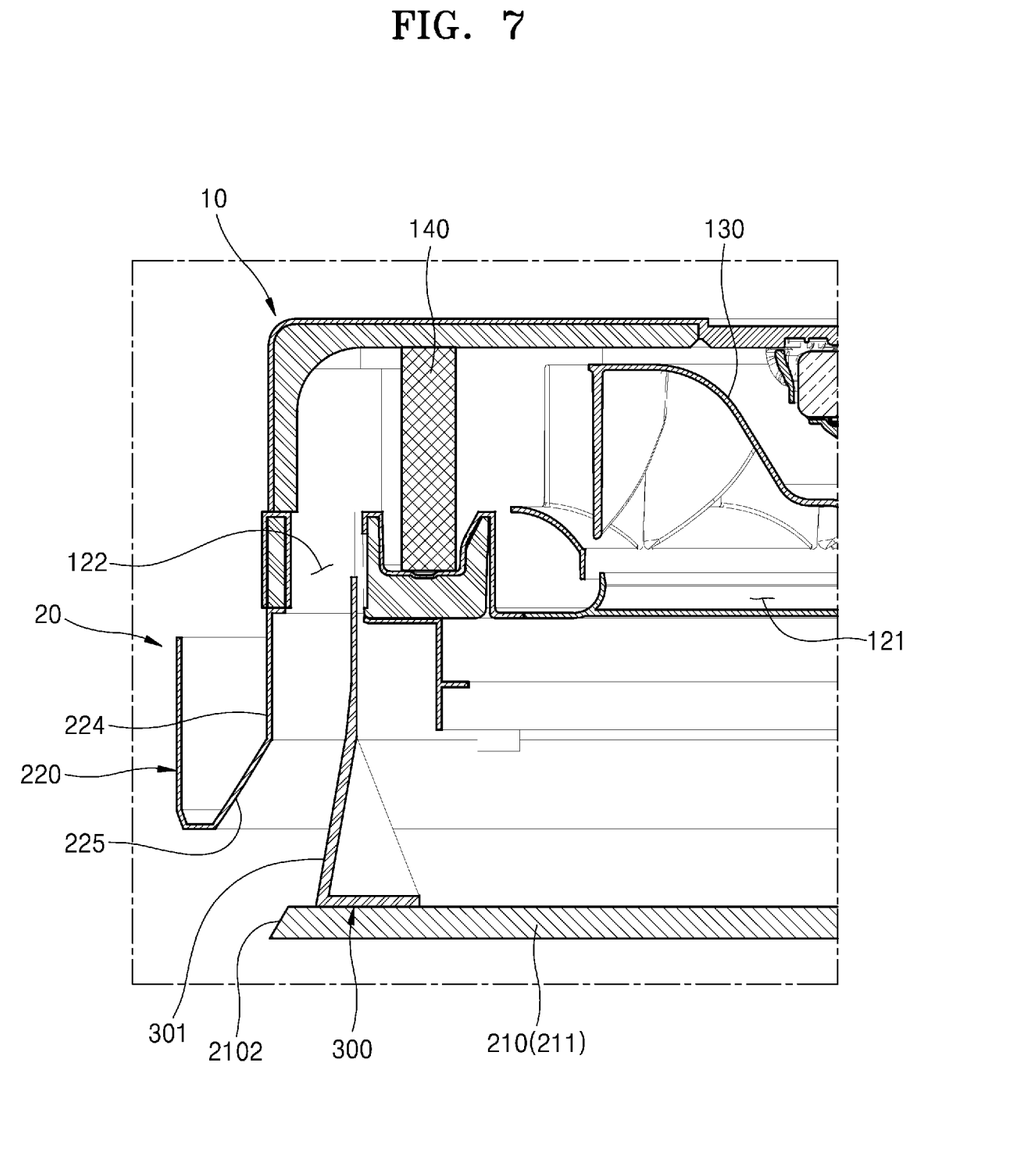
FIG. 7 is a cross-sectional view of the air conditioner in which a part of FIG. 5 is enlarged.
Figure 8:
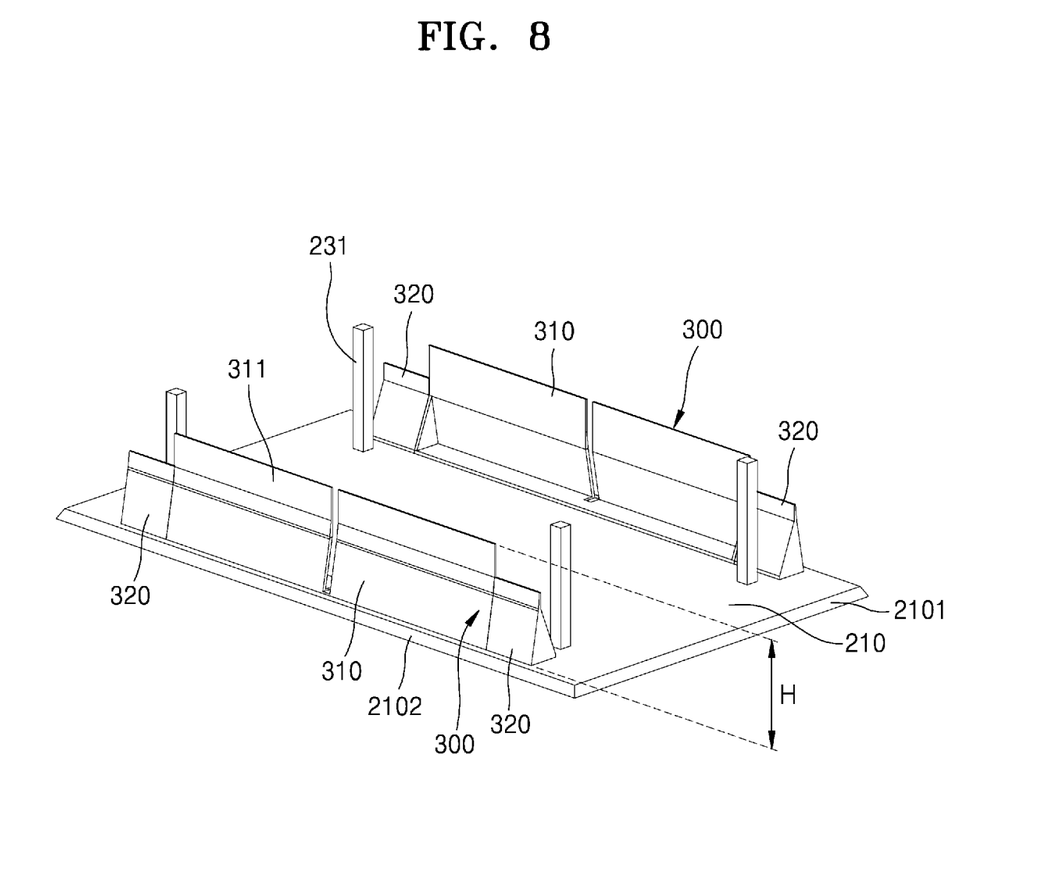
FIG. 8 is a perspective view of the air conditioner mainly showing the lighting panel and a discharge guide of FIG. 4.
Figure 9:
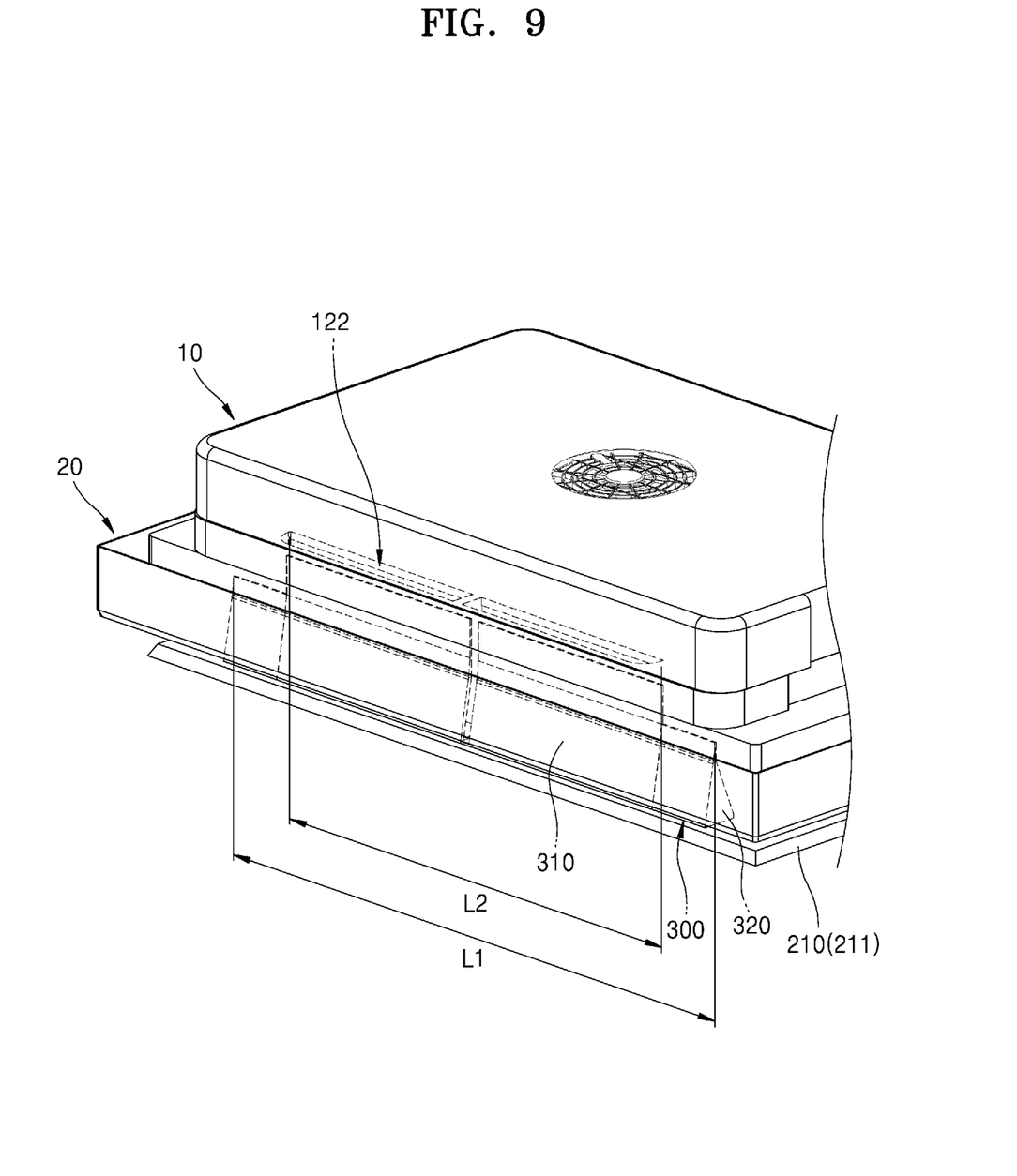
FIG. 9 is a perspective view of the air conditioner of FIG. 4, viewed from another angle.
Figure 10:
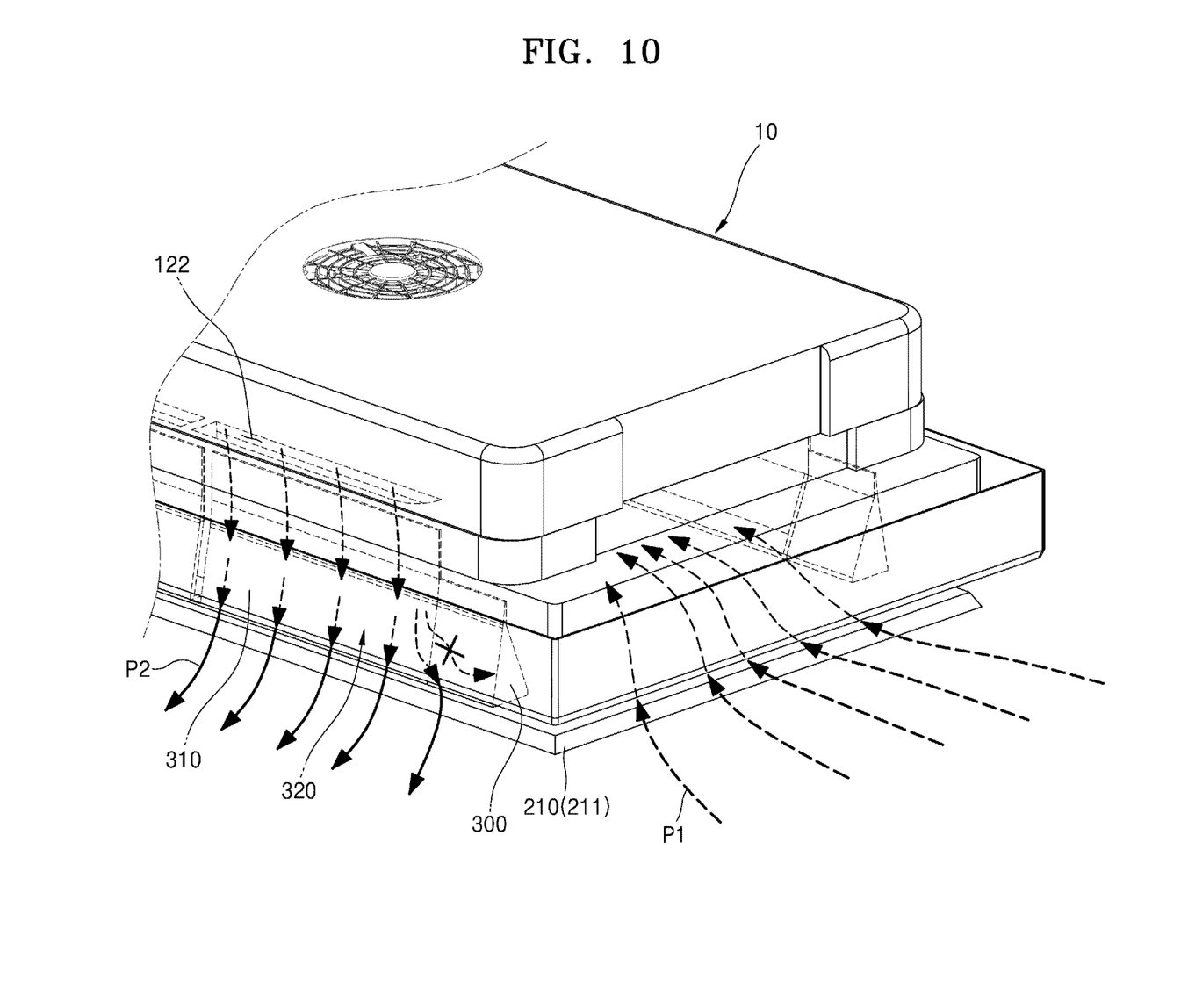
FIG. 10 is a view for describing a function of the discharge guide in the air conditioner of FIG. 9.

FIG. 7 is a cross-sectional view of the air conditioner in which a part of FIG. 5 is enlarged, and FIG. 8 is a perspective view of the air conditioner mainly showing the lighting panel 210 and the discharge guide 300 of FIG. 4. FIG. 9 is a perspective view of the air conditioner 1 of FIG. 4, viewed from another angle, and FIG. 10 is a view for describing a function of the discharge guide 300 in the air conditioner 1 of FIG. 9.

Referring to FIGS. 7 and 8, the discharge guide 300 may guide the air discharged from the air outlet 122 to be discharged outside the lighting module 20, and may block intake of the air through the air inlet 121.

When the lighting panel 210 is at the first position 211, the air conditioning module 10 may operate and the indoor air sucked through the air inlet 121 may be discharged through the air outlet 122 after passing through the heat exchanger 140. When the lighting panel 210 is at the first position 211, the discharge guide 300 may guide the air discharged from the air outlet 122 to be discharged outside the lighting module 20, and may block intake of the air through the air inlet 121.

For example, the discharge guide 300 may be installed on a top surface of the lighting panel 210. The discharge guide 300 may be arranged in opposite sides on the top surface of the lighting panel 210. The discharge guide 300 may be arranged to overlap the air outlet 122 in the up-down direction z. The discharge guide 300 may have a downwardly-inclined slope 301. The discharge guide 300 may extend in an edge shape of the lighting panel 210.

When the lighting panel 210 is moved in the up-down direction z, the discharge guide 300 may be moved up and down together with the lighting panel 210. Referring to FIGS. 3 and 5, as the discharge guide 300 is moved in the up-down direction z, the gap between the discharge guide 300 and the lighting frame 220 may be changed. When the lighting panel 210 is at the first position 211, the discharge guide 300 may guide the air discharged from the air outlet 122 to be discharged while passing through some edges of the lighting panel 210. The air discharged from the air outlet 122 may be discharged outside by being guided by the discharge guide 300 and the slope 225 of the lighting frame 220.

Referring to FIG. 9, the discharge guide 300 may extend in a longitudinal direction of the air outlet 122. A length L1 of the discharge guide 300 may be greater than a length L2 of the air outlet 122. The length L1 of the discharge guide 300 may be about 110% to about 130% of the length L2 of the air outlet 122. As the length L1 of the discharge guide 300 is formed greater than the length L2 of the air outlet 122, the air discharged from the air outlet 122 may be prevented from being sucked through the air inlet 121.

Referring to FIGS. 8 to 10, the discharge guide 300 may include a guide region 310 that guides the air discharged from the air outlet 122 and a blocking region 320 that blocks the air discharged from the air outlet 122 from being sucked through the air inlet 121.

The blocking region 320 may be provided in opposite sides of the guide region 310. The blocking region 320 may separate an air intake path P1 in which the indoor air moves toward the air inlet 121 and an air discharge path P2 in which the air discharged from the air outlet 122 moves toward the outside. The blocking region 320 may block the air discharged from the air outlet 122 from being sucked through the air inlet 121.

The discharge guide 300 may extend toward the air outlet 122 and have a certain height H. The height H of the discharge guide 300 may be designed based on a distance D1 between the top surface of the lighting panel 210 and the bottom surface of the housing 110 when the lighting panel 210 is at the first position 211.

Referring back to FIGS. 3 and 8, the height H of the discharge guide 300 may be greater than a distance D2 between the top surface of the lighting panel 210 and the bottom surface of the housing 110 when the lighting panel 210 is at the second position 212. When the lighting panel 210 is at the second position 212, a part 311 of the discharge guide 300 may be inserted into the air outlet 122. For example, the part 311 of the guide region 310 may be inserted into the air outlet 122.

In the embodiment of the disclosure described above, it is described as an example that the first position 211 of the lighting panel 210 at which the air intake through the air inlet 121 and the air discharge from the air outlet 122 are possible is one, but the disclosure is not limited to the example. For example, the first position 211 of the lighting panel 210 may be plural as long as the air intake through the air inlet 121 and the air discharge from the air outlet 122 are possible.

Figure 11:
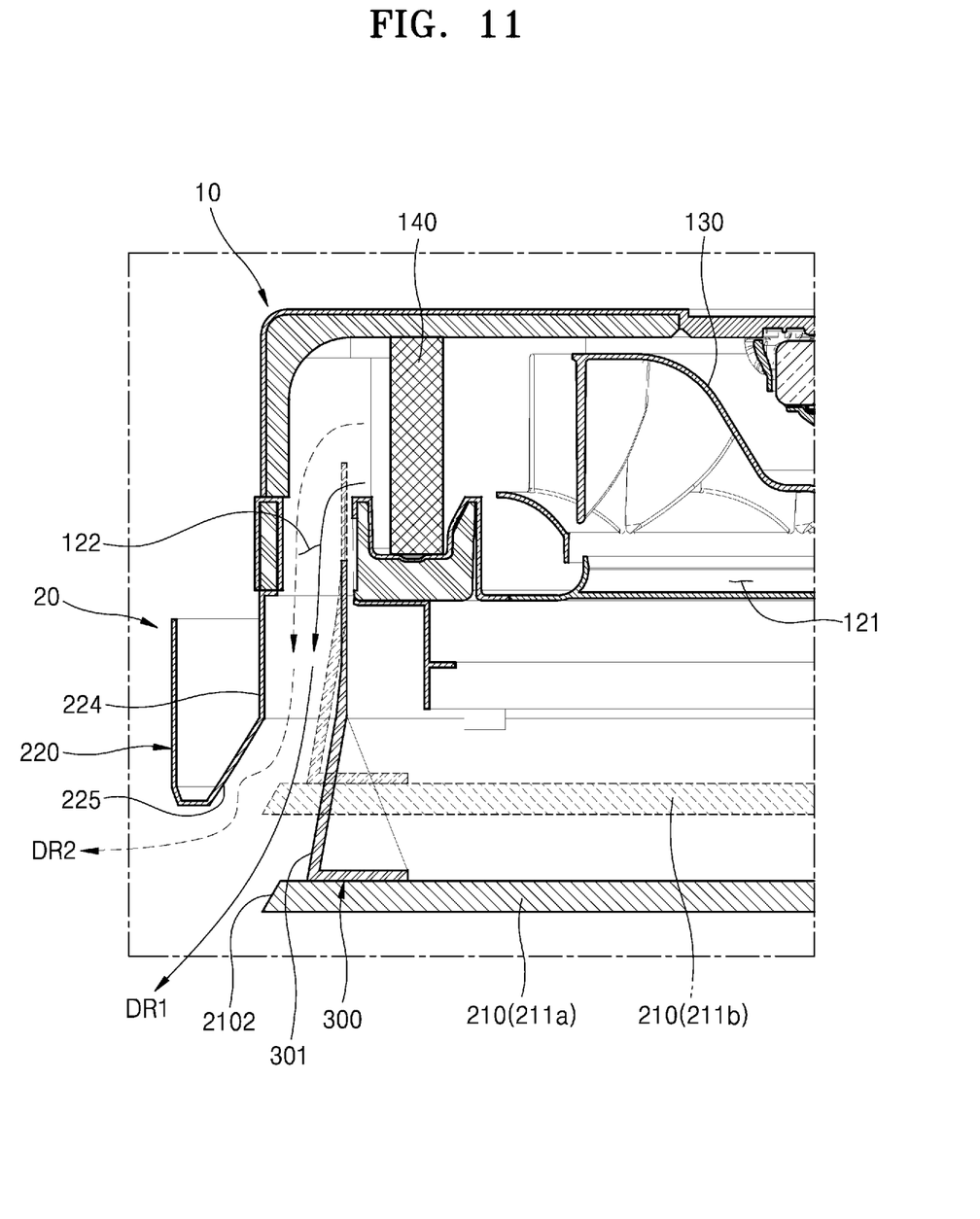
FIG. 11 is a partial cross-sectional view of an air conditioner according to an embodiment of the disclosure.

FIG. 11 is a partial cross-sectional view of the air conditioner 1 according to an embodiment of the disclosure. Referring to FIG. 11, the first position 211 of the lighting panel 210 according to an embodiment of the disclosure may include a first open position 211a and a second open position 211b elevated from the first open position 211a. The second open position 211b may be between the first open position 211a and the second open position 212.

When the lighting panel 210 is at the first open position 211a and the second open position 211b, the air conditioning module 10 may operate and the indoor air sucked through the air inlet 121 may be discharged through the air outlet 122 by passing through the heat exchanger 140.

When the lighting panel 210 is at the first open position 211a, the air discharged from the air outlet 122 may be discharged in a first direction DR1, and when the lighting panel 210 is at the second open position 211b, the air discharged from the air outlet 122 may be discharged in a second direction DR2. The first direction DR1 may be oriented downward compared to the second direction DR2. As such, by changing the first position 211 of the lighting panel 210, the direction of the air discharged from the air outlet 122 may be changed.

Meanwhile, in the embodiment of the disclosure described above, the discharge guide 300 has the fixed height H and the part 311 of the discharge guide 300 is inserted into the air outlet 122 when the lighting panel 210 is moved in the up-down direction z, but the shape of the discharge guide 300 is not limited thereto and may be changed variously as long as the discharge guide 300 has a structure for guiding the air discharged from the air outlet 122. For example, although not shown, the discharge guide 300 may have a structure in which the height thereof changes when the lighting panel 210 is moved in the up-down direction z.

Figure 12:
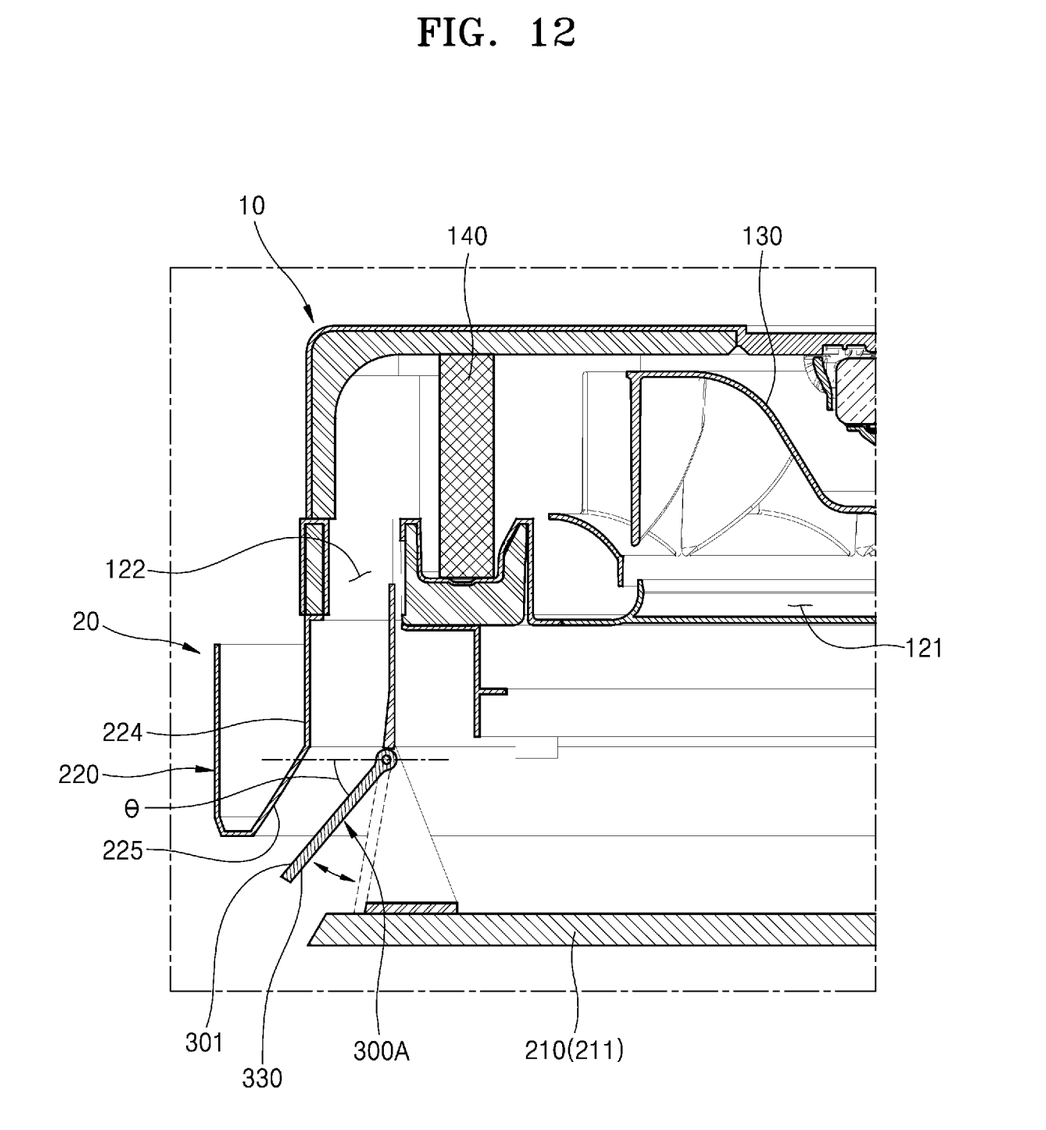
FIG. 12 is a view for describing a discharge guide according to an embodiment of the disclosure.

FIG. 12 is a view for describing a discharge guide 300A according to an embodiment of the disclosure. Referring to FIG. 11, the discharge guide 300A may include an inclination adjusting unit 330 capable of adjusting an inclination θ of the slope 301. The inclination adjusting unit 330 may be structured to rotate around a certain rotation axis. The inclination adjusting unit 330 may control the moving direction of the air discharged outside by adjusting the inclination θ of the slope 301.

For example, the inclination adjusting unit 330 may decrease the inclination angle θ of the slope 301 in a planar direction (the xy direction) to spread the cool air around when the air conditioner 1 operates in a cooling mode, and may increase the inclination angle θ of the slope 301 in a planar direction (the xy direction) to transfer the hot air downward when the air conditioner 1 operates in a heating mode.

An air conditioner according to embodiments of the disclosure described above may improve the freedom of arrangement of the lighting panel by moving the lighting panel in the up-down direction, and implement a good air conditioning function through the discharge guide that guides the air discharge when the lighting panel is lowered.

An air conditioner according to an embodiment of the disclosure includes an air conditioning module including a housing provided with an air inlet and an air outlet, and a heat exchanger and a fan that are arranged inside the housing, and a lighting module including a lighting panel overlapping the air inlet and the air outlet and being movable in an up-down direction, in which the lighting panel has a first position to which the lighting panel is lowered with respect to the air conditioning module to enable air intake through the air inlet and air discharge from the air outlet, and a second position to which the lighting panel is elevated to be close to the air inlet and the air outlet, and the air conditioner further includes a discharge guide guiding the air discharged from the air outlet to be discharged outside the lighting module and blocking the air from being sucked through the air inlet when the lighting panel is at the first position.

A length of the discharge guide may be greater than a length of the air outlet.

The discharge guide may include a guide region guiding the air discharged from the air outlet and a blocking region provided in opposite sides of the guide region and blocking the air discharged from the air outlet from being sucked through the air inlet.

The discharge guide may be arranged on a top surface of the lighting panel, and may be moved together together with the lighting panel when the lighting panel is moved up and down.

A part of the discharge guide may be inserted into the air outlet when the lighting panel is at the second position.

The discharge guide may include a downwardly-inclined slope.

The discharge guide may include an inclination adjusting unit configured to adjust an inclination of the slope.

The lighting module may further include a lighting frame providing an accommodating space for accommodating the lighting panel while surrounding an edge of the lighting panel.

The lighting panel may protrude downwardly from the lighting frame when the lighting panel is at the first position, and the lighting panel may be accommodated in the accommodating space when the lighting panel is at the second position.

A gap between the edge of the lighting panel and the lighting frame may increase when the lighting panel is moved from the second position to the first position by being lowered.

The lighting frame may include a slope that is inclined downwardly while surrounding the edge of the lighting panel.

When the lighting panel is at the first position, indoor air may be sucked through the air inlet by passing through a partial region of the edge of the lighting panel, and the air discharged from the air outlet may be discharged outside by passing through the other region of the edge of the lighting panel.

The air inlet may be arranged in a center portion on a bottom surface of the housing, and the air outlet may be arranged in opposite sides with the air inlet therebetween on the bottom surface of the housing.

The lighting panel may include a pair of first edges facing each other and a pair of second edges connecting end portions of the pair of first edges, and when the lighting panel is at the first position, the indoor air may be sucked through the air inlet by passing through the pair of first edges, and the air discharged from the air outlet may be discharged outside by passing through the pair of second edges.

The air conditioner may further include an elevating unit including a support pillar supporting the lighting panel and an elevating driving unit elevating the support pillar.

To understand the disclosure, reference numerals have been given in preferred embodiments of the disclosure shown in the drawings, and specific terms are used to describe the embodiments of the disclosure, but the disclosure is not limited by the specific terms, and the disclosure may include all the components that are normally thought by those of ordinary skill in the art.

Certain executions described here are embodiments of the disclosure, not limiting the scope of the disclosure in any way. For the brevity of the specification, the description of conventional electronic configurations, control systems, software, and other functional aspects of the systems may be omitted. Connections of lines or connection members between components shown in the drawings are illustrative of functional connections and/or physical or circuit connections, and in practice, may be represented as alternative or additional various functional connections, physical connections, or circuit connections. In addition, when there is no specific mentioning, such as "essential" or "important", it may not be a necessary component for the application of the disclosure. An expression such as "comprising", "including", etc., used herein has been used to be understood as terms of an open end of the description.

In the specification (especially, claims) of the disclosure, the use of the term "the" and similar indicators thereof may correspond to both the singular and the plural. In addition, when the range is described in the disclosure, the range includes the disclosure to which an individual value falling within the range is applied (unless stated otherwise), and is the same as the description of an individual value constituting the range in the detailed description of the disclosure. Finally, when there is no apparent description of the order of operations constituting the method according to the disclosure or a contrary description thereof, the operations may be performed in an appropriate order. However, the disclosure is not necessarily limited according to the describing order of the operations. The use of all examples or exemplary terms (for example, etc.) in the disclosure are to simply describe the disclosure in detail, and unless the range of the disclosure is not limited by the examples or the exemplary terms unless limited by the claims. In addition, it would be apparent to those of ordinary skill in the art that various modifications and changes may be easily made without departing from the scope and spirit of the disclosure.

What is claimed is:

1. An air conditioner comprising:
    an air conditioning module comprising:
        a housing including an air inlet and an air outlet,
        a heat exchanger in the housing, and
        a fan in the housing;
    a lighting module comprising a lighting panel that overlaps the air inlet and the air outlet and that is movable with respect to the housing and is thereby movable with respect to the air inlet and the air outlet; and
    a discharge guide between the air conditioning module and the lighting module that moves with the lighting module and thereby moves with respect to the air inlet and the air outlet,
    wherein the lighting panel is moveable between:
        a first position in which the lighting panel allows air to enter the air inlet and allows air to be discharged from the air outlet, and the discharge guide blocks the air that is discharged from the air outlet from entering the air inlet, and
        a second position in which the lighting panel restricts air from entering the air inlet and restricts air from being discharged from the air outlet as compared to when the lighting panel is in the first position.

2. The air conditioner of claim 1, wherein a length of the discharge guide is greater than a length of the air outlet.

3. The air conditioner of claim 1, wherein the discharge guide comprises:
 a guide region that guides the air that is discharged from the air outlet; and
 a blocking region on opposite sides of the guide region and that blocks the air that is discharged from the air outlet from entering the air inlet.

4. The air conditioner of claim 1, wherein the discharge guide is coupled to a top surface of the lighting panel.

5. The air conditioner of claim 1, wherein at least part of the discharge guide is inserted into the air outlet when the lighting panel is in the second position.

6. The air conditioner of claim 1, wherein the discharge guide comprises:
 a downwardly-inclined sloped surface.

7. The air conditioner of claim 6, wherein the discharge guide comprises:
 an inclination adjusting unit configured to adjust an inclination of the slope.

8. The air conditioner of claim 1, wherein the lighting module further comprises a lighting frame having a space configured to accommodate the lighting panel when the lighting panel is in the second position.

9. The air conditioner of claim 8, wherein the lighting panel protrudes downwardly from the lighting frame when the lighting panel is in the first position.

10. The air conditioner of claim 8, further comprising:
 a gap between an edge of the lighting panel and the lighting frame,
 wherein the gap increases as the lighting panel moves from the second position to the first position.

11. The air conditioner of claim 10, wherein the lighting frame comprises:
 a sloped surface that is inclined downwardly and that surrounds the edge of the lighting panel.

12. The air conditioner of claim 10, wherein when the lighting panel is in the first position:
 air passes through one part of the edge of the lighting panel and then enters the air inlet, and
 air is discharged from the air outlet and then passes through a different part of the edge of the lighting panel.

13. The air conditioner of claim 1, wherein the air inlet is in a center portion of the housing on a bottom surface of the housing, and the air outlet is on opposite sides of the air inlet on the bottom surface of the housing.

14. The air conditioner of claim 13, wherein the lighting panel comprises:
 a pair of first edges facing each other; and
 a pair of second edges connecting end portions of the pair of first edges, and
 when the lighting panel is in the first position, air passes through the pair of first edges and is sucked through the air inlet, and is then discharged from the air outlet and passes through the pair of second edges.

15. The air conditioner of claim 1, further comprising:
 an elevating unit comprising:
 a support pillar supporting the lighting panel, and
 an elevating driving unit configured to elevate the support pillar.

16. The air conditioner of claim 1, wherein, when the lighting panel is in the second position, the lighting panel blocks air from entering the air inlet and blocks air from being discharged from the air outlet.

\* \* \* \* \*